Patented Dec. 12, 1933

1,938,791

UNITED STATES PATENT OFFICE 1,938,791

COMPOSITION OF MATTER AND PROCESS FOR MAKING SAME

William C. Arsem, Schenectady, N. Y.

No Drawing. Application January 23, 1928
Serial No. 248,972

20 Claims. (Cl. 260—8)

My invention relates to certain new compositions of matter which are valuable as plasticizing substances for nitrocellulose, as components of synthetic resins, and for other purposes. These substances are esterification compounds in which polyhydric alcohols and monohydric alcohols are combined with polybasic acids to form complex structures best described as "mixed esters."

The types of compounds contemplated, the method of reaction, and the structures produced are best illustrated by the following type equations in which

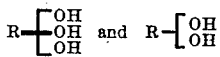

represent polyhydric alcohols, R'—OH represents a monohydric alcohol, and A(COOH)$_2$ represents a polybasic acid.

My invention contemplates the production of a neutral ester structure containing no free carboxyl groups or hydroxyl groups, as follows:

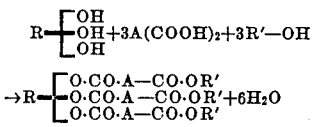

My invention also contemplates the production of ester structures in which one or more free hydroxyl groups remain in the polyhydric component, as follows:

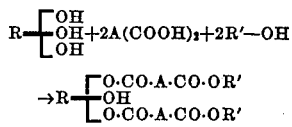

My invention also contemplates the production of ester structures in which the polyhydric alcohol component is a dihydric alcohol and one or more of the hydroxyl groups of said alcohol are attached to the carboxyl groups of a polybasic acid, as follows:

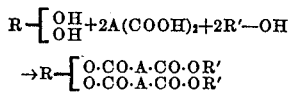

and, also:

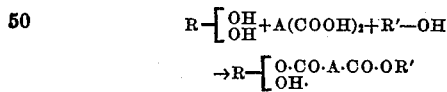

My new compositions may be synthesized in several ways. For example, the polybasic acid may be mixed with proportionate quantities of polyhydric and monohydric alcohols, and the mixture may be heated in the presence of an esterification catalyst. Such a process will produce the desired compound, but on account of the complex character of the mixture, large quantities of by-products will also be produced. Consequently, I prefer to synthesize the mixed ester compositions in two or more steps.

For example, I may first react a polyhydric alcohol with a polybasic acid according to the following equation:

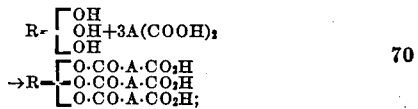

after which the remaining free carboxyl groups in the compound may be reacted with a monohydric alcohol, by ordinary esterification.

Alternatively, a monohydric alcohol may be reacted with a polybasic acid to produce a half ester or "acid ester" according to the following equation:

$$A(COOH)_2 + R'—OH$$
$$\rightarrow R'—O \cdot CO \cdot A \cdot CO_2H;$$

after which two or three molecules may be reacted with a polyhydric alcohol according to the following equations:

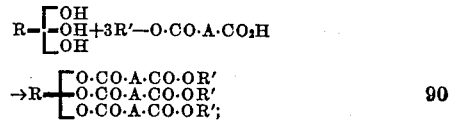

or:

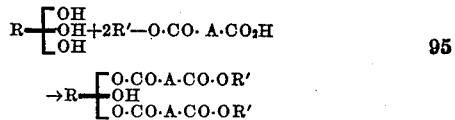

I may, alternatively, combine the polyhydric alcohol with the polybasic acid to produce an ester compound containing free carboxyl groups and I may then neutralize the remaining carboxyl groups to form a salt such as the sodium salt. I may then react this salt with the halide of a monohydric alcohol to produce the desired compound. Such a course of reaction is shown in the following equations:

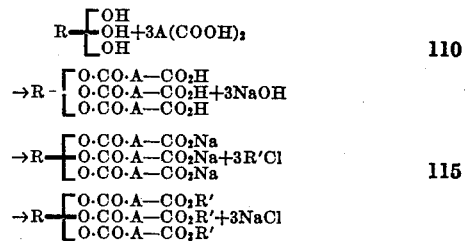

Of the various polybasic acids, phthalic acid is best suited for use in my improved compositions on account of its stability, cheapness, and ease of reaction. I may, however, employ other polybasic acids such as terephthalic acid, tartaric acid, citric acid, or the like.

Of the various polyhydric alcohols, glycerine and ethylene glycol are best suited for use. Any monohydric alcohol may be used, but I prefer to employ normal butyl alcohol.

My new compositions are viscous liquids or flowable solids at ordinary room temperatures. The large molecular structure precludes the possibility of distilling these compounds at atmospheric pressure without decomposition. These substances exert a plasticizing action on nitrocellulose and gums and are miscible with lacquers and plastic compositions.

Now, having generally described my invention, I shall mention various specific compositions.

EXAMPLE IA

*Reaction product of glycerine, butyl, alcohol, and phthalic acid (anhydrine)*

The character of the composition produced by the interaction of glycerine, butyl alcohol, and phthalic anhydride will depend on the proportion of reacting ingredients. A mixed phthalic ester of glycerine and normal butyl alcohol, in which two of the three hydroxyl groups of the glycerine molecule are esterified, may be conveniently prepared in the following manner:

One mole (46 grams) of glycerine is mixed with two moles (148 grams) of phthalic anhydride and the mixture is heated at 150–200° C. for 10–15 minutes, whereby glyceryl phthalic acid is produced, presumably in accordance with the following equations:

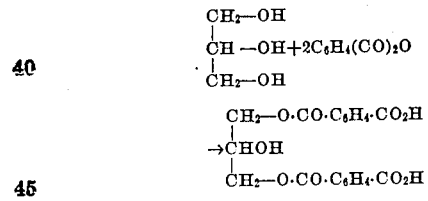

To this compound there is added about 200 grams (a great molecular excess( of normal butyl alcohol mixed with 5–10 grams of sulfuric acid, the latter substance being added to catalyze the esterification.

The composite mixture is heated to promote the esterification. This results in the vaporization of butyl alcohol which is distilled from the mixture, carrying with it (in the form of a constant boiling mixture) the water formed by the esterification process. The removal of the water, as formed, promotes the completion of the reaction, which occurs in accordance with the following equation:

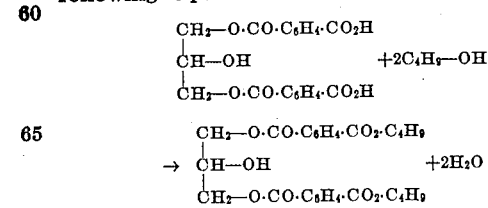

To remove the last traces of water and to assure substantially complete esterification, it is sometimes advisable to add about 50 grams butyl alcohol after the distillation of the alcohol originally present is nearly complete.

To reduce the formation of by-products and to prevent decomposition of the formed material, it is desirable that the distillation be conducted at a temperature not exceeding about 100° C. This may be accomplished by conducting the distillation under a partial vacuum, or in the presence of benzol.

In the manner described a composition showing a molecular weight of about 480, as compared to theoretical molecular weight of 500, may be produced. The principal by-product, which causes reduction in the apparent molecular weight, is dibutyl phthalate. The presence of traces of this material in no way interferes with the use of the composition as a lacquer plasticizer or as a component of synthetic resin or plastic compositions.

Error in the proportions of reacting ingredients or too high a temperature during distillation may cause a production of by-products or decomposition products which will reduce the apparent molecular weight to 380–420. The product thus produced is suitable, nevertheless, for plasticizing purposes.

The product thus obtained is washed with sodium carbonate or other alkaline solution to remove the sulfuric acid catalyst and is then dried. By warming the viscous liquid product with infusorial earth or activated carbon and then filtering, any suspended matter present is removed and the resultant product is nearly colorless.

EXAMPLE IB

*Reaction product of glycerine, butyl alcohol and phthalic acid (anhydride)*

If a proportion of three moles of phthalic anhydride to one mole glycerine is used in the reaction above described, the subsequent operations being the same, a product having the following coposition is produced:

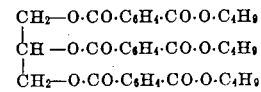

This product represents a completely esterified glycerine molecule. However, in practice the production of this compound may be accompanied by the formation of by-products so that the apparent molecular weight of the product is reduced, and the composite is less viscous than the compound formerly described. The product thus obtained may be distilled in vacuo to remove dibutyl phthalate and other volatile by-products, whereupon a nearly pure compound is produced, as is evidenced by its molecular weight, which is 630, as compared to theoretical, 704.

EXAMPLE IC

*Reaction product of glycerine, butyl alcohol, and phthalic acid (anhydride)*

Instead of producing a glyceryl half ester of phthalic acid and then completing the esterification with butyl alcohol, the procedure may be reversed.

326 grams of monobutyl phthalate is prepared by heating phthalic anhydride and butyl alcohol together in proportionate quantities. 46 grams of glycerol and 5 grams of sulfuric acid are then added. About 200 grams of benzol is added and the mixture is heated to distill off the benzol. Fresh benzol is added as needed, and the distillation is continued for about thirty hours. By this procedure the water of esterification is removed by the benzol, as formed. The product thus obtained is washed to remove sulfuric acid, dried, and clarified with carbon. A large amount of dibutyl phthalate, formed as a by-product, may be removed by vacuum distillation.

EXAMPLE II

*Reaction product of glycerine, ethyl alcohol, and phthalic acid (anhydride)*

A mixture of 148 grams of phthalic anhydride and 60 grams of ethyl alcohol is heated together to produce monoethyl phthalate. The temperature of reaction is kept at about 70° C. at first, but may be raised somewhat as the reaction becomes complete. 46 grams of glycerine and 5 grams of sulfuric acid are added. 200 grams of benzol is then added and the mixture is heated, a constant boiling mixture of benzol and water (of esterification) being evolved. From time to time fresh benzol is added, to keep the reaction temperature below 100° C. The heating is continued until the esterification is complete, which requires five to ten hours.

The product thus obtained is washed, dried, and clarified in the usual manner. It is a viscous, practically colorless, liquid containing some diethyl phthalate as a by-product.

EXAMPLE III

*Reaction product of glycerine, benzyl alcohol, and phthalic acid (anhydride)*

Glyceryl phthalic acid is prepared as in Example I, by combining 23 grams of glycerine and 72 grams of phthalic anhydride. 65 grams of benzyl alcohol, 5 grams of sulfuric acid, and 150 grams of benzol are then added and the mixture is heated. Benzol distills off, taking with it the water formed by the esterification. From time to time, more benzol is added as needed, the heating period being continued for about three hours. The reaction product is washed, dried, and clarified by the usual methods.

Benzyl glyceryl phthalate produced by this method is a viscous, almost colorless, liquid having an apparent molecular weight of about 500. It exerts a plasticizing action on nitrocellulose and is a useful ingredient in lacquers and synthetic resins and plastics.

EXAMPLE IV

*Reaction product of glycerine, butyl alcohol, and tartaric acid*

149 grams of tartaric acid is mixed with 46 grams glycerine, and the composite is heated at about 150° C. for 1-2 hours, to produce glyceryl tartaric acid. To this mixture there is then added 150 grams butyl alcohol, 5 grams sulfuric acid, and about 150 grams benzol. The mixture is then heated and the benzol is distilled off, carrying with it the water of esterification together with some butyl alcohol. Fresh benzol is added, as required, to maintain the temperature of the reaction mixture below 100° C. After about three hours of treatment, the remaining benzol and excess butyl alcohol is removed by vacuum distillation. The product is washed, dried, and clarified in the usual manner. Glyceryl butyl tartrate, thus produced, is a viscous liquid having a plasticizing action on nitrocellulose.

EXAMPLE V

*Reaction product of ethylene glycol, butyl alcohol, and phthalic acid (anhydride)*

150 grams of phthalic anhydride is heated with 30 grams of ethylene glycol. The temperature is raised to 180° C., after which the mixture is allowed to cool. 100 grams of butyl alcohol and 7 grams of sulfuric acid are added, and the mixture is heated to distill off the butyl alcohol, which carries with it the water formed during esterification. With about 30 cc. of distillate has been collected, 50 cc. of fresh butyl alcohol is added and distillation is continued until the lower layer of the condensate contains about 24 cc.

The product is washed with water, neutralized with sodium carbonate solution, washed, and dried by heating in vacuo to 180° C. to remove low boiling impurities.

Glycol butyl phthalate thus produced is a light brown viscous oily material that cannot be distilled without decomposition.

EXAMPLE VI

*Reaction product of ethylene glycol, ethyl alcohol, and phthalic acid (anhydride)*

148 grams of phthalic anhydride and 60 grams of ethyl alcohol are heated together to produce monoethyl phthalate. 31 grams of ethylene glycol, and 5 grams sulfuric acid, and about 200 grams of benzol are added, and the mixture is heated. Heating is continued for about three hours, fresh benzol being added from time to time to replace that which distills off, carrying with it the water of reaction.

The product thus obtained is washed, dried, and clarified in the usual manner.

As shown in the specific examples cited, my new compositions may be prepared with either aromatic or aliphatic acids and alcohols. In place of ethyl or butyl alcohols, propyl, methyl, amyl, or other monohydric alcohols may be employed. In place of benzyl alcohol, other monohydric aromatic alcohols may be used. On account of the greater ease of reaction, the anhydrides of polybasic acids, rather than the acids themselves, may be conveniently employed.

Sulfuric acid is the preferred catalyst for esterification, on account of its stable non-volatile nature and on account of the relative ease with which its removal from the product may be effected. However, I have found by experiment that other esterification catalysts such as hydrochloric acid or phosphoric acid are likewise effective.

In cases where it is desired to remove the water formed during esterification as a constant-boiling mixture with some inert ingredient, substances other than benzol, described in the specific examples, may be employed. Carbon tetrachloride is also suitable for use in this manner.

It is, of course, necessary to wash the reaction products with an alkaline solution to remove the esterification catalyst. In practice, if complete esterification of the polybasic acid is not achieved, the alkaline wash solution may also remove free acid and thus further purify the product.

In the present specification, I have mentioned the fact that my new compositions are useful as plasticizing agents for nitrocellulose and as components of synthetic resins. In my respective co-pending applications, Serial 250,077, filed January 27, 1928, and Serial 248,982, filed January 23rd, 1928, I have disclosed and claimed said inventions. For that reason, the present specification is directed specifically to my novel compositions and to methods for preparing the same.

Now, having fully described my invention, I claim the following as new and novel:

1. An esterification product having the following structural formula, in which R is a polyhydric alcohol group, R' is a monohydric alcohol group, and A is a polybasic acid:

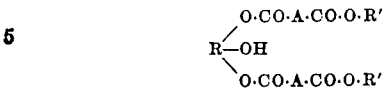

2. An esterification product, in which two hydroxyl groups of a glycerine molecule are reacted with the free carboxyl groups of an acid, monohydric alcohol ester of phthalic acid, the product having the following structural formula in which R' is a monohydric alcohol group:

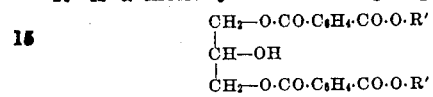

3. A product as described in claim 2, in which R' is the butyl group.

4. As a new composition of matter, a non-volatile viscous esterification product in which at least one of the hydroxyl groups of a polyhydric alcohol are united with an acid, monohydric alcohol ester of a polybasic organic acid.

5. As a new composition of matter, a non-volatile viscous esterification product of glyceryl phthalic acid with a monohydric alcohol.

6. As a new composition of matter, a non-volatile viscous reaction product of glyceryl phthalic acid with butyl alcohol.

7. As a new composition of matter, a non-volatile viscous product having a molecular weight of about 400, comprising the reaction product of one molecule of glycerine, two molecules of phthalic acid, and two molecules of butyl alcohol.

8. As a new composition of matter a non-volatile viscous product having a molecular weight of about 400, comprising the reaction product of one molecule of glyceryl phthalic acid, in which two phthalic acid groups are present, with two molecules of a monohydric alcohol.

9. A product as described in claim 8 in which the monohydric alcohol is butyl alcohol.

10. A process which comprises heating a polyhydric alcohol with a polybasic organic acid to produce an acid ester, and esterifying said acid ester with a monohydric alcohol.

11. A process which comprises heating one molecule of glycerine with at least two molecules of phthalic anhydride, and esterifying the resultant glyceryl phthalic acid with a monohydric alcohol.

12. A process which comprises heating one molecule of a polyhydric alcohol with at least two molecules of phthalic anhydride, adding to said reaction product a monohydric alcohol, a substance forming a constant-boiling mixture with water, and an esterification catalyst, heating said mixture to about 100° C. to complete the esterification and removing the water of reaction, washing the resultant product to remove acid, and drying said product.

13. A process which comprises heating one molecule of glycerine with two molecules of phthalic anhydride, adding a molecular excess of butyl alcohol and an esterification catalyst to said mixture, heating to remove excess butyl alcohol and the water of reaction, washing the resultant esterification product to remove acid, and drying said product.

14. An esterification product resulting from the chemical interaction of a polyhydric alcohol, a monohydric alcohol and an organic polybasic acid.

15. The process of making an esterification product which consists in causing chemical interaction between an organic polybasic acid and a monohydric alcohol by heating the ingredients, thereupon adding a polyhydric alcohol and continuing the reaction until an esterification product forms.

16. The process of making an esterification product which consists in causing chemical interaction, by heating both glycerine and the compound of a monohydric alcohol and phthalic acid.

17. A soluble esterification product of glycerine, phthalic anhydride and a monohydric alcohol.

18. A soluble esterification product of glycerine, phthalic anhydride and butyl alcohol.

19. An esterification product resulting from the chemical interaction of a polyhydric alcohol, butyl alcohol and an organic polybasic acid.

20. An esterification product resulting from the chemical interaction of glycerine, phthalic anhydride and a monohydric alcohol.

WILLIAM C. ARSEM.